United States Patent
Blomstedt

(10) Patent No.: US 11,409,122 B2
(45) Date of Patent: Aug. 9, 2022

(54) MULTILAYER WAVEGUIDE DISPLAY ELEMENT

(71) Applicant: DISPELIX OY, Espoo (FI)

(72) Inventor: Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 229 days.

(21) Appl. No.: 16/954,952

(22) PCT Filed: Dec. 20, 2018

(86) PCT No.: PCT/FI2018/050958
§ 371 (c)(1),
(2) Date: Jun. 17, 2020

(87) PCT Pub. No.: WO2019/122528
PCT Pub. Date: Jun. 27, 2019

(65) Prior Publication Data
US 2020/0333614 A1    Oct. 22, 2020

(30) Foreign Application Priority Data
Dec. 22, 2017 (FI) .................................. 20176156

(51) Int. Cl.
*G02B 27/42* (2006.01)
*G02B 5/18* (2006.01)
*G02B 27/01* (2006.01)

(52) U.S. Cl.
CPC ....... *G02B 27/4205* (2013.01); *G02B 5/1819* (2013.01); *G02B 5/1828* (2013.01); *G02B 27/0172* (2013.01); *G02B 27/4272* (2013.01)

(58) Field of Classification Search
CPC ............ G02B 27/4205; G02B 27/0172; G02B 27/4272; G02B 27/4233; G02B 5/1819; G02B 5/1828
See application file for complete search history.

(56) References Cited

U.S. PATENT DOCUMENTS

| 9,134,535 | B2 * | 9/2015 | Dobschal | ........... G02B 27/0101 |
| 11,054,651 | B2 * | 7/2021 | Dobschal | ........... G02B 27/0172 |

(Continued)

FOREIGN PATENT DOCUMENTS

| CN | 106526730 A | 3/2017 |
| DE | 102016109288 A1 | 11/2017 |

(Continued)

OTHER PUBLICATIONS

Finnish Office Action dated Jun. 15, 2018 as received in application No. 20176156.

(Continued)

*Primary Examiner* — Collin X Beatty
(74) *Attorney, Agent, or Firm* — Maschoff Brennan

(57) ABSTRACT

The invention relates to a waveguide display element for guiding an image from a first lateral zone of the element to a second lateral zone of the element, the element comprising a plurality of waveguide layers (40A-E) on top of each other. The element further comprises at least one intermediate diffractive optical element (44AB, 44BC, 44AD, 44DE) arranged between two of said waveguide layers. The intermediate diffractive optical element (44AB, 44BC, 44AD, 44DE) is adapted to change the distribution of propagating light power between the layers. The invention also concerns a diffractive display device comprising such element.

20 Claims, 3 Drawing Sheets

(56) References Cited

U.S. PATENT DOCUMENTS

| | | | |
|---|---|---|---|
| 11,281,010 B2* | 3/2022 | Blomstedt | G02B 6/0035 |
| 2006/0126179 A1 | 6/2006 | Levola | |
| 2010/0246003 A1 | 9/2010 | Simmonds et al. | |
| 2011/0026128 A1 | 2/2011 | Baker et al. | |
| 2017/0045745 A1* | 2/2017 | Piskunov | G06F 1/00 |
| 2017/0059879 A1* | 3/2017 | Vallius | G02B 27/4205 |
| 2017/0123208 A1 | 5/2017 | Vallius | |
| 2017/0131546 A1 | 5/2017 | Woltman et al. | |
| 2017/0139110 A1 | 5/2017 | Woodgate et al. | |
| 2017/0235144 A1 | 8/2017 | Piskunov et al. | |
| 2017/0257089 A1 | 12/2017 | Zehetbauer | |
| 2017/0357089 A1* | 12/2017 | Tervo | G02B 6/0026 |
| 2017/0363870 A1* | 12/2017 | Cakmakci | G02B 27/0172 |
| 2018/0196275 A1* | 7/2018 | Robinson | G02B 30/33 |
| 2021/0063638 A1* | 3/2021 | Baets | G02B 6/12007 |

FOREIGN PATENT DOCUMENTS

| | | | | |
|---|---|---|---|---|
| EP | 2733517 A1 | 5/2014 | | |
| WO | WO-2017003674 A1 * | 1/2017 | | G02B 27/0081 |
| WO | 2017120320 A1 | 7/2017 | | |

OTHER PUBLICATIONS

Chinese Office Action dated Aug. 3, 2021 as received in application No. 201880081674.5.
European Search Report dated Jul. 20, 2021 as received in application No. 18893292.

* cited by examiner

MULTILAYER WAVEGUIDE DISPLAY ELEMENT

FIELD OF THE INVENTION

The invention relates to diffractive waveguide display elements, which can be used in personal display devices, such as head-mounted displays (HMDs) and head-up displays (HUDs).

BACKGROUND OF THE INVENTION

Diffractive waveguide elements typically comprise a single waveguide layer or a plurality of stacked layers. In the case of several layers, different colors or different parts of the field-of-view of the image to be displayed can be guided in different layers. In that case, each of the layers comprises a separate in-coupling grating for coupling part of the image to the layer, and a separate out-coupling grating for coupling the part of the image out of the element.

US 2017131546 A1, D2_EP 2733517 A1 and CN 106526730 A disclose waveguides, which may have multiple layers.

The disclosed schemes are relatively limited, as concerns the design choices one can make.

SUMMARY OF THE INVENTION

It is an aim of the invention to overcome limitations of the prior art and to provide a waveguide which offers new freedoms of design.

The invention is based on providing a multilayer waveguide in which there is one or more gratings or other diffractive optical element between the layers for redistributing the light power between the layers while the light propagates in the waveguide. Thus, at one lateral point, the ratio of light power between the layers is different from another lateral point along the propagation path of light. This is in contrast with prior solutions in which the once in-coupled light remains in the same layer until out-coupled therefrom.

In particular, the invention is characterized by what is stated in the independent claims.

Thus, according to one aspect, the invention provides waveguide display element for guiding an image from a first lateral zone of the element to a second lateral zone of the element, the element comprising a plurality of waveguide layers on top of each other. The element further comprises at least one intermediate diffractive optical element arranged between two of said waveguide layers. The intermediate diffractive optical element is adapted to change the distribution of propagating light power between the layers.

The invention offers significant benefits. Most importantly, the invention provides new freedoms of design. Light which is once coupled to propagate in one layer need not stay there until out-coupled, but can be moved to a neighboring layer one or more times. This allows for implementing completely new display products.

By transferring power selectively to the out-coupling layer from underlying layers, one can control the amount of out-coupled light spatially. Thus, the out-coupling modulation can be implemented by the one or more intermediate DOEs instead of direct modulation of the out-coupling grating.

In the case of a staircase-profiled waveguide, the intermediate DOEs can be used to make the light to "climb" the stairs. Between the stairs, more layers can be used for light propagation and/or in/out-coupling and at the region of the discrete stairs the light is packed to a lesser number of layers or to one layer only. Alternatively, or in addition to that, a targeted transition from one layer to another can be made exactly at the location of a stair. Staircase profile is beneficial for example when implementing waveguides with a definite focus plane.

In in-coupling, the invention can be used to assist in multiplication of laser beams so as to provide a denser field of beams at the out-coupling, for preventing striping of the image as seen by the user.

There are also other use cases for the invention. The invention can be used in narrow-wavelength waveguides, such as laser-illuminated waveguides, but is applicable also in wideband applications.

It should be noted that the invention concerns changing the power distribution of propagating light. That is, for example light coupled out of the waveguide and passing through an intermediate layer without propagating therein—or that is not intended to propagate to a significant degree therein—is not in the focus of the invention and does not change the power distribution in the present sense.

The dependent claims are directed to selected embodiments of the invention.

The diffractive optical response of the at least one intermediate DOE may be non-constant or constant within the area of the element. With a constant element, one can achieve a laterally constant shift of light power from one layer to another. With a non-constant element, a localized shift of power or a laterally varying power shift distribution can be achieved, for example. Local power redistribution offers new possibilities, some of which are exemplified herein in detail.

In some embodiments, the element comprises an out-coupling DOE on a first of said layers at said second lateral zone, and the intermediate DOE is adapted to pass light power from a second layer adjacent to said first layer to the first layer depending on the position within said second zone so as to control the distribution of light out-coupled from the waveguide. This allows for implementing complex output functions for the display using uniform and high-efficiency out-coupling grating as the out-coupling DOE.

In some embodiments, the waveguide has a staircase profile comprising at least one discrete step in the propagation path of light from said first zone to said second zone, and the intermediate DOE is adapted to control the distribution of light between said layers for assisting the propagating light power to pass the step. In some embodiments, at least one of the layers of the waveguide element continues over the step as a continuous layer, and the intermediate DOE is adapted to increase light power in the continuous layer before the step for assisting light to "climb the stair".

In some embodiments, the element comprises a plurality of in-coupling diffractive optical elements at said first lateral zone, the in-coupling diffractive optical elements being associated with said layers for coupling initial light power into the layers.

In some embodiments, the intermediate DOE is provided between waveguide layers having different thicknesses, so that the amount of rays, directed to thinner of the layers is multiplied and coupled by the intermediate optical element to the thicker of the layers. This has particular relevance in the case of coherent narrow-beam laser illumination.

In some embodiments, the intermediate DOE covers the zone of the element from the first lateral zone (image in-coupling zone) to the second lateral zone (image out-coupling zone). In that case, the DOE typically has a non-constant diffractive optical response so that the coupling efficiency is higher at one location thereof than at another location thereof.

In some embodiments, the waveguide element comprises at least three waveguide layers and at least two such intermediate diffractive optical elements between pairs of waveguide layers.

The waveguide layers can be stacked layers, each intermediate DOE being manufactured onto one of the waveguide layers before stacking. The waveguide layers can also be formed of a unitary piece of light-guiding material being partitioned by fabricating said intermediate diffractive optical element.

In some embodiments, the intermediate DOE between any two waveguide layers provides a spatially continuous optical interaction between the layers, there typically being continuous light transfer in both directions and the net flow of light power being towards one of the layers at least at some location of the DOE.

Next, embodiments of the invention and advantages thereof are discussed in more detail with reference to the attached drawings.

DETAILED DESCRIPTION OF EMBODIMENTS

Definitions

Figure 1:
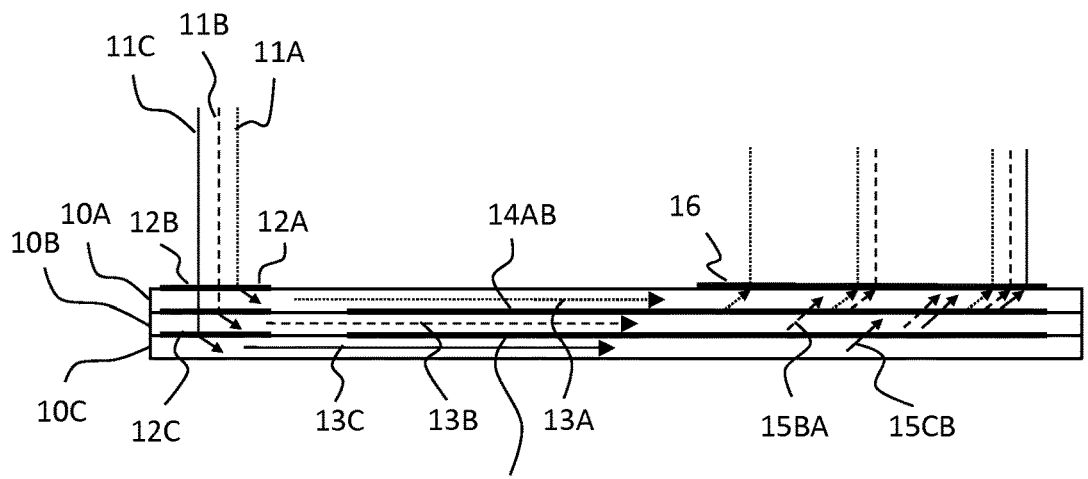
FIGS. 1-5 show a cross-sectional side views of exemplary multilayer waveguides according to the invention.

The term "diffractive optical element" (DOE) refers to a zone of the waveguide body comprising a physical structure capable of diffracting light. The structure typically comprises a pattern of features having a size of 1 µm or less. The DOE may be either periodic or non-periodic and have a constant (single-region) or non-constant diffractive optical response over its area. A non-constant diffractive optical response DOE may be a multi-region DOE.

The term "intermediate DOE" refers to a DOE that is not intended to out-couple light directly therefrom, but to change the propagation path of light rays from one layer to another. Due to imperfections, a certain amount of out-coupling may, however, occur. Typically, at least 90% of propagating light hitting the intermediate DOE continues propagation in either the original layer or the new layer, depending on the predefined optical response.

"Diffractive optical response" of the DOE refers to the change in the angular and/or spectral distribution of light by the DOE due to diffraction. To concretize, the response may be e.g. diffraction intensity to a specific angle for a fixed incident angle and wavelength. A diffractive microstructure pattern of the DOE generates the diffractive optical response.

"Multi-region" DOE refers to a DOE that has several internal regions with different diffractive optical response. In some designs, the regions have a real area and the diffractive optical response within those regions is constant. The smooth changing of the diffractive optical response takes place between the regions. In alternative designs, the regions are infinitesimally small, whereby the smooth changing takes place essentially throughout the DOE. Also combinations of these designs are possible.

"Staircase profile" means a surface profile with a plurality of discrete (abrupt) height changes. The profile has a plurality of distinguishable sub-surfaces at an angle with respect to neighboring sub-surfaces in at least one cross-sectional plane, thus forming a plurality of steps resembling the form of a staircase. In particular, every second sub-surface (principal surface) can be parallel or approximately parallel with is neighboring every second sub-surface. The dimensions of the steps in the general plane of the waveguide by are larger than the optical diffractive limit so that the profile itself does not cause significant diffraction of light but rather guide the light according to a desired geometric scheme with high efficiency.

Description of Selected Embodiments

Next, the principles and embodiments of the invention are discussed using cross-sectional images and one-dimensional light propagation as examples. The same principles can be, however, used in waveguides, where light propagates not just along one in-plane axis thereof, but two-dimensionally along both axes.

The layered waveguides discussed herein can be used to control the power distribution inside the waveguide. This can be utilized e.g. in augmented reality (AR) applications by for example designing the system so that most of the light propagates in a central part of the waveguide in at least some section thereof. Thereby it is not exposed to out-coupling gratings on the waveguide surface, which means that the overall power distribution does not have to be considered in detail at these gratings, but can instead be handled by selecting the inter-waveguide gratings appropriately. Such decoupling of the optical functions of the waveguide leads to a greater number of design freedoms, which translates into improved performance.

FIG. 1 shows a multi-layer waveguide comprising three layers 10A, 10B, 10C. Each layer comprises an in-coupling grating 12A, 12B, 12C that couples incoming light beams 11A, 11B, 11C, respectively, to the layers 10A, 10B, 10C to propagate therein as propagating waves 13A, 13B, 13C (herein shown as arrows showing the net propagation direction, although in reality bouncing between waveguide surfaces and/or limiting DOEs is seen). Between the layers, there are intermediate diffractive optical elements 14AB, 14BC, that are configured, at predefined locations thereof, to couple light from one layer to another. In this example, light is transferred from the middle layer 10B to the topmost layer 10A as net flow 15BA and from the bottom layer 10C to the middle layer as net flow 15CB. Light continues to propagate in the new layer until again coupled to another layer. Thus, because of the net flows 15BA, 15CB, the distribution of light between the layers is different depending on the location. When light propagating in the topmost layer 10A meets the out-coupling grating 16, it is coupled out. The out-coupling distribution depends on the "feeding" of the topmost layer 10A by the underlying layers 10B, 10C.

It should be noted that generally the DOEs herein discussed are non-binary and/or the indices of refraction of the waveguides between which the DOEs are located are different. For such DOEs, there is no reciprocity of light travel between propagating rays going from a first layer to a second layer and vice versa (i.e. rays coming from one direction and going, while propagating laterally, "up" and "down" at the same location). This allows for the net flow of light power to take place through the layer interface, although in practice there is always some amount of flow to both directions. In the figures, the arrows across DOEs illustrate the net flow.

Figure 2:
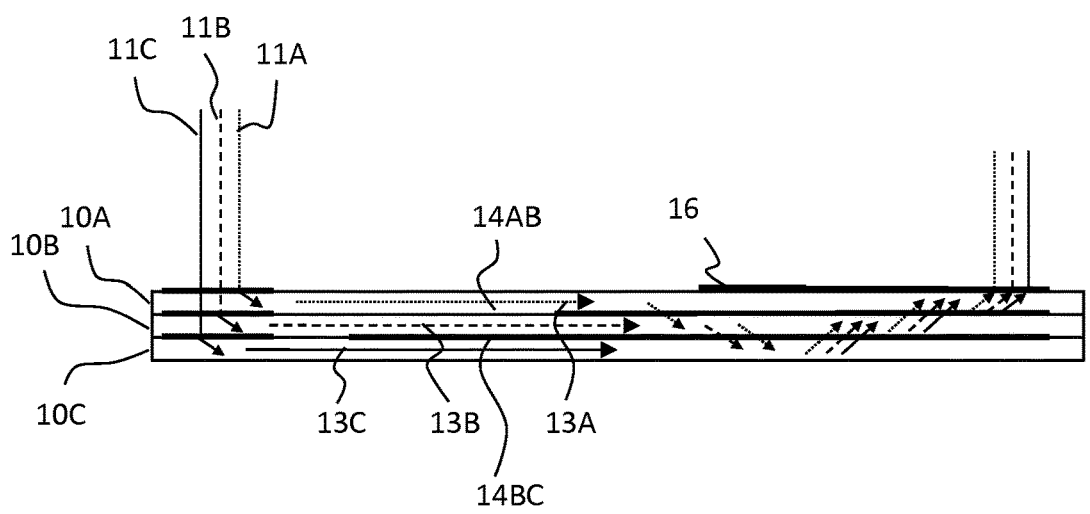

FIG. 2 shows an embodiment, where there is two-way net flow of light. First, propagating light is transferred from the top layer 10A and the middle layer 10B to the bottom layer 10C. Then, from the bottom layer 10C, all rays are transferred first to the middle layer 10B to the top layer 10A and further out of the waveguide.

Figure 3:
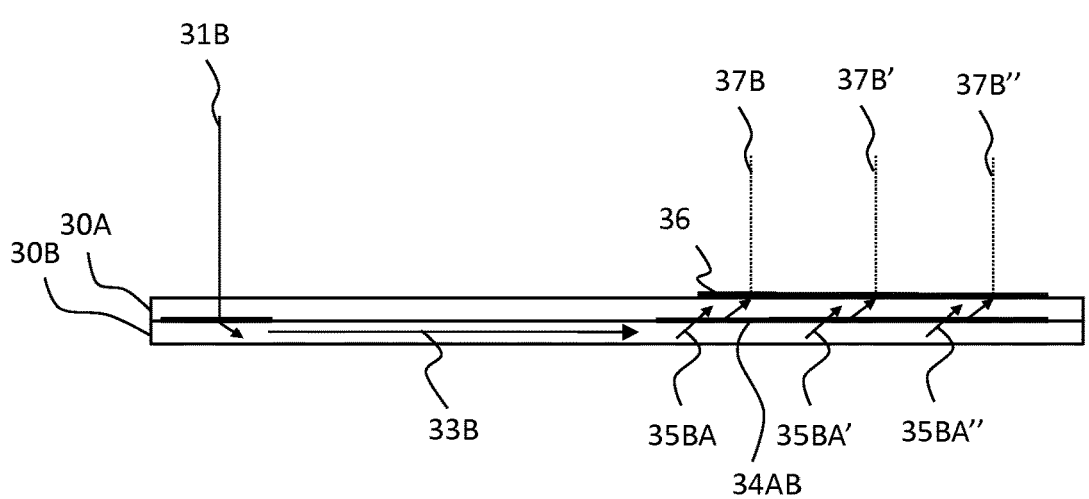

FIG. 3 illustrates controlling the out-coupling efficiency of the waveguide using the intermediate diffractive optical element. The waveguide comprises a top layer 30A and bottom layer 30B. All incoming light 31B is at first coupled to the bottom layer 30B, where it propagates laterally via total internal reflections as light field 33B. Aligned with the out-coupling grating 36 on top of the top layer 30A, there is an intermediate DOE 34AB. The intermediate DOE 34AB transfers selectively light from the bottom layer 30B to the top layer 30A, with coupling efficiency depending on the location. At a first location, a net flow 35BA is seen, at another location, there is net flow 35BA' and at a third location, there is net flow 35BA". These net flows determine the spatial distribution of light power at the top layer 30A, that interacts with the out-coupling grating 36. Therefore, different intensities of out-coupled light beams 37B, 37B', 37B" are seen, depending on the location.

A benefit of the arrangement of FIG. 3 is that as light is coupled to the bottom layer 30B, leakage in in-coupled light back through the in-coupling grating 31B can be prevented to high degree or even entirely.

In one embodiment, the out-coupling grating 36 is a non-modulated grating, i.e. has a constant coupling efficiency over its area. The out-coupling efficiency is entirely regulated by the properties of the underlying intermediate diffractive optical element, which may be a modulated grating or have a more complex diffractive response. Indeed, in some embodiments, the intermediate DOE is adapted to pass a non-even light power distribution from one layer to another. This can be achieved using a multi-region DOE, an efficiency-modulated grating or the like.

Staircase waveguides comprise a specific waveguide structure where the ability to control the power distribution is an essential improvement. Indeed, in these structures light has to pass from one stacked waveguide to another with as little lost light as possible, and one potential solution to this problem is provided by a waveguide layer common to both stacked waveguides.

Figure 6:
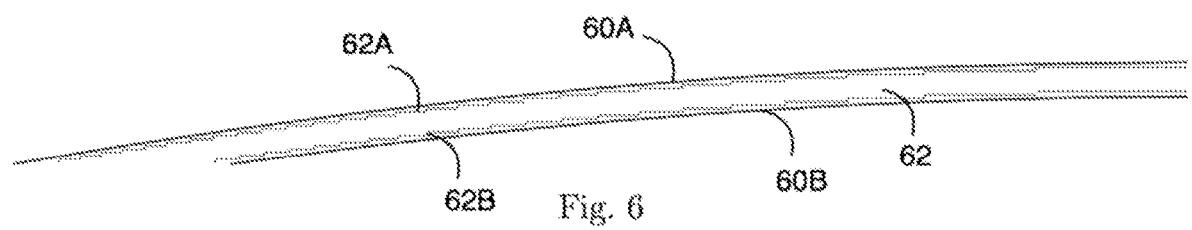
FIGS. 6-8 illustrate in cross-sectional views different variations of waveguide elements having staircase surface profiles.
Figure 7:
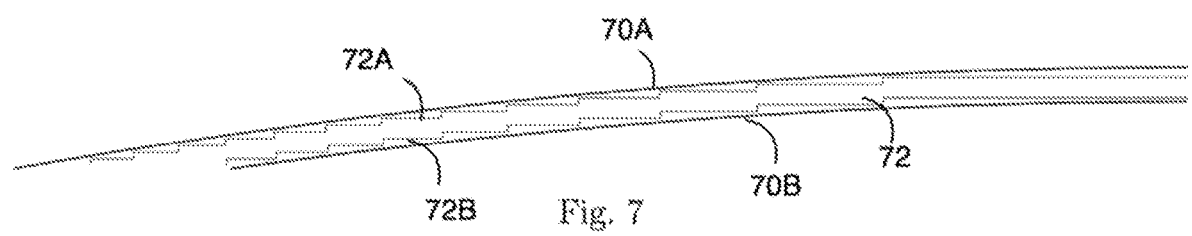
Figure 8:
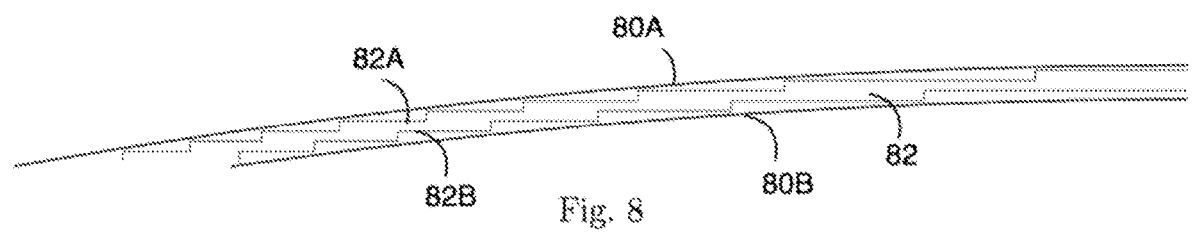

FIGS. 6-8 show examples of staircase waveguides. A staircase waveguide is a diffractive waveguide element which comprises a waveguide region 62, 72, 82 defined by two optical surfaces 62A, 62B; 72A, 72B; 82A, 82B, at least one of which has a staircase profile, and between which light can propagate by total internal reflections, the optical surfaces having surface profiles, and at least one diffractive optical element, in particular a grating, capable of modifying the light field within the waveguide region.

FIGS. 6-8 illustrate that different step-sizes of the waveguide region can be used to produce staircase waveguides that follow the same outer surface shape. The outer surface 60A, 60B; 70A, 70B, 80A, 80B may be physically explicitly present or imaginary. In the latter case, the staircase surfaces 62A, 62B; 72A, 72B; 82A, 82B, or a surface-conformant coating thereon, typically form the outer surface of the waveguide. In FIGS. 6 and 7, the first and second surface profiles have stairs (intermediate surfaces) aligned with each other in the horizontal direction. The stair height in FIG. 6 is smaller than in FIG. 7. In FIG. 8, the stairs in the first and second surfaces 82A, 82B are interleaved, i.e. non-aligned with each other. However, the resulting waveguide 82 implements the same general waveguide shape as the waveguides 62, 72 of FIGS. 6 and 7.

Figure 4:
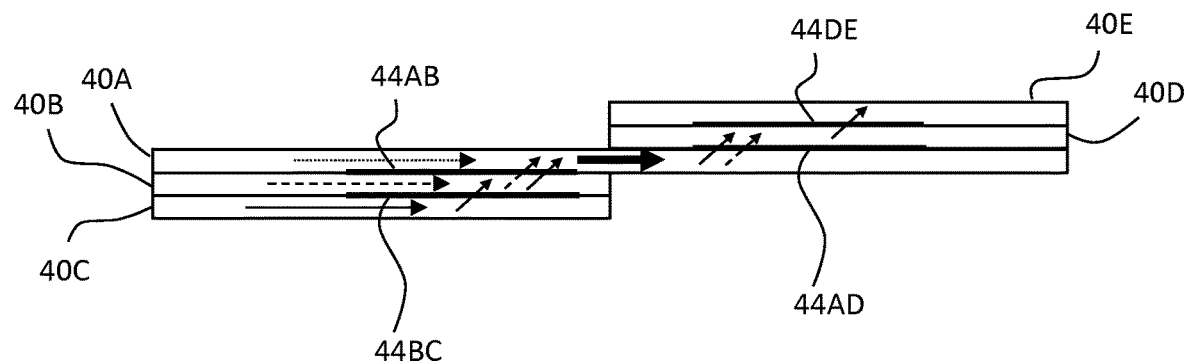

FIG. 4 shows one possible implementation of the inner structure of a waveguide region of a staircase waveguide. Instead of a single waveguide layer only, it comprises a plurality of layers 40A-E at least one of which continues as unbroken over the stair. On each side of the stair, there are several layers, herein three layers 40A, 40B, 40C/40A, 40D, 40E, respectively. Light is initially coupled to a plurality of first side layers 40A, 40B, 40C. Upstream of the stair, there is provide at least one DOE 44AB, 44BC, which is adapted to change the power distribution of light between the layers 40A, 40B, 40C so that light is "packed" to the continuous layer 40A before the stair. In that layer, all power is transferred to the second side of the stair. Thus, the light "climbs" the stair conveniently. On the second side, the light power may again re-distributed between the layers 40A, 40D, 40E using intermediate diffractive optical elements 44AD, 44DE.

Figure 5:
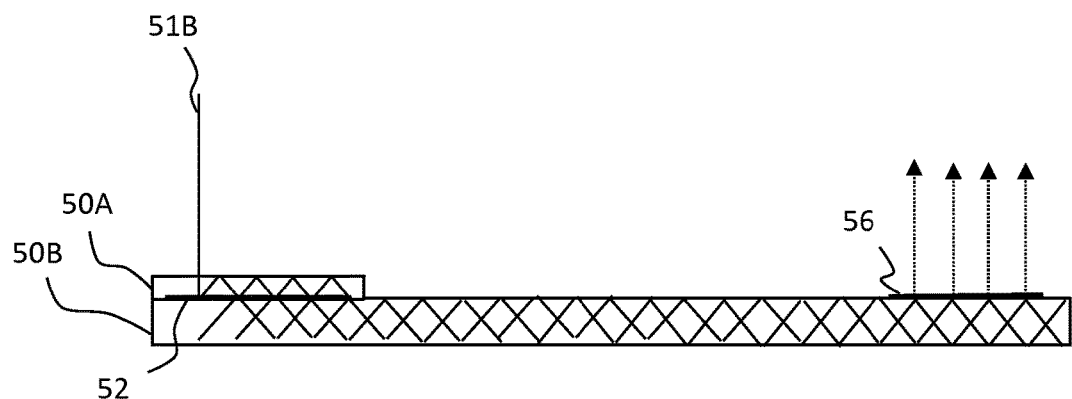

FIG. 5 shows an embodiment, where a ray multiplier layer 50A is provided on another waveguide layer 50B. The multiplier layer 50A comprises a waveguide which is thinner and smaller in area than the main waveguide layer 50B. The intermediate DOE 52, herein also serving as the in-coupling grating, is provided between the multiplier layer 50A and the main waveguide 50B. The incident ray 51B bounces in the multiplier layer 50A with short bounce period, and at each bounce at the in-coupling grating 52, part of light is diffracted into the display waveguide 50B. Thus, the ray is multiplied and a denser field of light rays exits the main waveguide 50B at the out-coupling grating 56. This provides significant benefits in particular in the case of laser-illuminated waveguides, in which striping of the image due to sparse out-coupled ray fields is a problem.

The intermediate DOE or DOEs may adapted to change the distribution of light power between the layers depending on the wavelength and/or angle of incidence.

Typically, the main propagation direction of light in each layer is the same, but this does not need to be the case. It is possible for example that the direction of net flow of light in different layers is the opposite, or there may be any oblique angle between the new flow directions.

These presented principles not only apply to planar waveguides, but can also be directly applied to curved waveguides, such as spherical waveguides. A spherical waveguide, for example, comprises two concentric spherical surfaces (the principal surfaces of the waveguide) between which the rays of the light-field bounce.

Embodiments of the invention can be utilized in various personal display devices, augmented reality (AR), virtual reality (VR) and mixed reality (MR) devices, like near-to-the-eye displays (NEDs) and other head-mounted displays (HMDs), as well as head-up displays (HUDs), in their different forms.

Even though not discussed here in detail, the waveguide or individual layers thereof may comprise, in addition to the intermediate DOE(s) and in-coupling and out-coupling gratings, also other diffractive optical elements, such as exit pupil expander gratings or beam redirection gratings.

The invention claimed is:

1. A waveguide display element for guiding an image from a first lateral zone of the element to a second lateral zone of the element, the element comprising:
   a plurality of waveguide layers on top of each other; and
   at least one intermediate diffractive optical element arranged between two of said waveguide layers, the intermediate diffractive optical element being adapted to change the distribution of propagating light power between the layers, wherein:
the waveguide has a staircase profile having at least one discrete step in the propagation path of light from said first zone to said second zone, and
the intermediate diffractive optical element is adapted to control the distribution of light between said layers for assisting the propagating light power to pass the step.

2. The element according to claim 1, wherein the at least one diffractive optical element has a diffractive optical response which is non-constant over the element.

3. The element according to claim 1, wherein the at least one diffractive optical element has a diffractive optical response which is constant over the whole element.

4. The element according to claim 1, wherein:
the element includes an out-coupling diffractive optical element on a first of said layers at said second lateral zone, and
the intermediate diffractive optical element is adapted to pass light power from a second layer adjacent to said first layer to the first layer depending on the position within said second lateral zone so as to control the distribution of light out-coupled from the waveguide.

5. The element according to claim 4, wherein the intermediate diffractive optical element is adapted to pass a non-even light power distribution from the second layer to the first layer.

6. The element according to claim 1, wherein:
at least one of said layers continues over said step as a continuous layer, and
the intermediate diffractive optical element is adapted to increase light power in said continuous layer before the step.

7. The element according to claim 1, wherein the element comprises a plurality of in-coupling diffractive optical elements at said first lateral zone, the in-coupling diffractive optical elements being associated with said layers for coupling initial light power into the layers.

8. The element according to claim 1, wherein the intermediate diffractive optical element is provided between waveguide layers having different thicknesses, so that the amount of rays directed to thinner of the layers is multiplied and coupled by the intermediate optical element to the thicker of the layers.

9. The element according to claim 1, wherein the intermediate diffractive optical element essentially covers the element as a unitary structure between the first lateral zone and the second lateral zone, the diffractive optical element typically having non-constant diffractive optical response.

10. The element according to claim 1, comprising:
at least three waveguide layers, and
at least two such intermediate diffractive optical elements between pairs of waveguide layers.

11. The element according to claim 1, wherein the waveguide layers are stacked layers, each intermediate optical element being manufactured onto one of the waveguide layers before stacking.

12. The element according to claim 1, wherein the waveguide layers are formed of a unitary piece of light-guiding material being partitioned by fabricating said intermediate diffractive optical element.

13. The element according to claim 1, wherein each intermediate optical element between a first waveguide layer and second waveguide layer provides a spatially continuous optical interaction between the first and second waveguide layers, the net flow of light power for propagating light being from one layer to another on at least one section of said intermediate optical element.

14. The element according to claim 1, wherein the intermediate diffractive optical element is adapted to change the distribution of light power between the layers depending on the wavelength and/or angle of incidence of light.

15. The element according to claim 1, wherein the intermediate diffractive optical element comprises a non-binary microstructure element and/or the intermediate diffractive optical element is placed between waveguide layers having different refractive indices.

16. The element according to claim 1, wherein there is provided an intermediate diffractive optical element between each two of said waveguide layers, the number of waveguide layers being three or more.

17. A diffractive personal display device, comprising:
a waveguide display element according claim 1, and
an image projector for providing an image onto said first zone for coupling the image into one or more of the waveguide layers.

18. A diffractive personal display device, comprising:
a waveguide display element according to claim 2, and
an image projector for providing an image onto said first zone for coupling the image into one or more of the waveguide layers.

19. A diffractive personal display device, comprising:
a waveguide display element according to claim 3, and
an image projector for providing an image onto said first zone for coupling the image into one or more of the waveguide layers.

20. A diffractive personal display device, comprising:
a waveguide display element according to claim 4, and
an image projector for providing an image onto said first zone for coupling the image into one or more of the waveguide layers.

* * * * *